April 13, 1943. R. P. DUNMIRE ET AL 2,316,571
APPARATUS FOR TREATING ROLLING OILS
Filed June 4, 1942
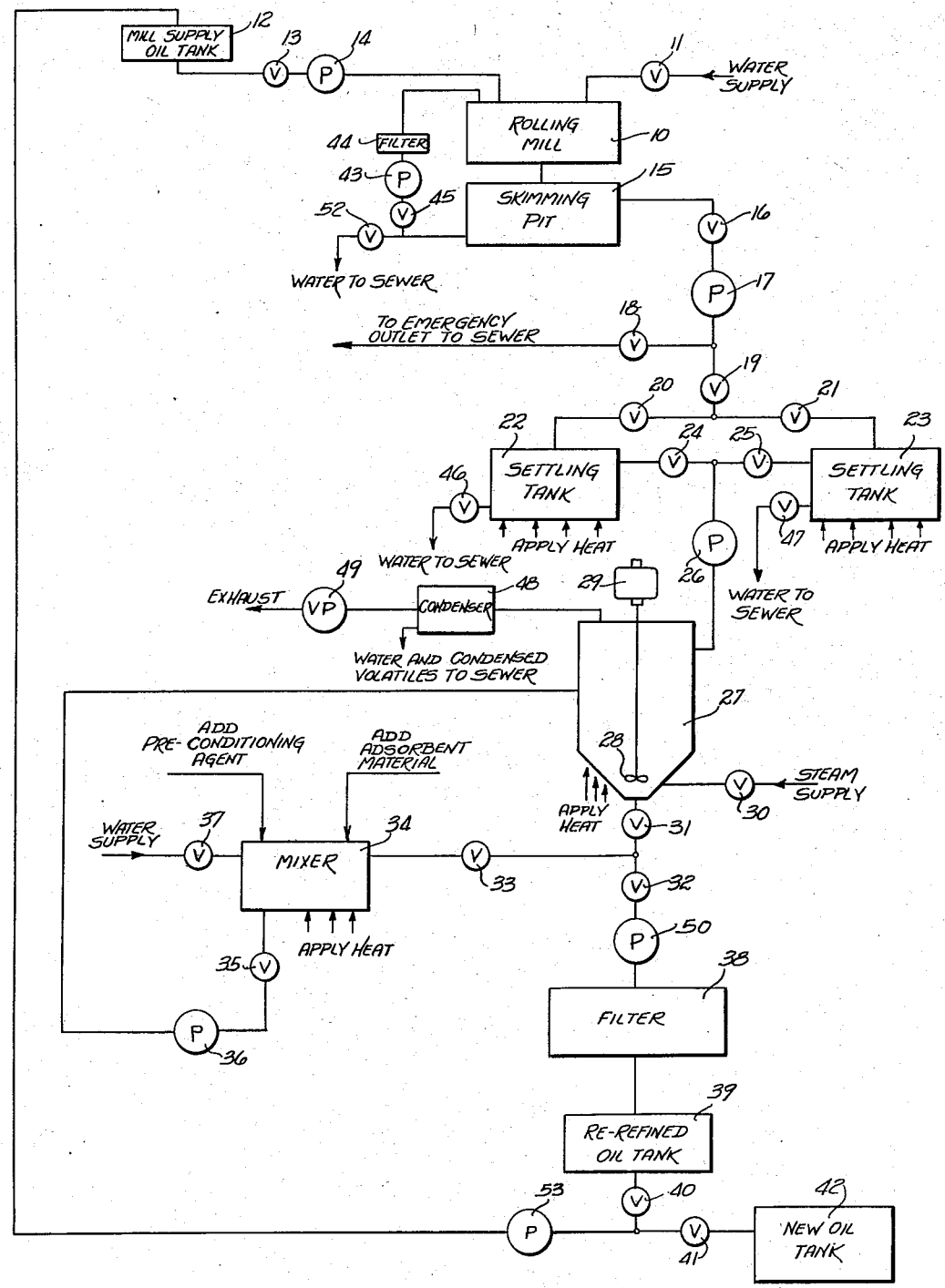
INVENTOR.
RUSSELL P. DUNMIRE &
BY JAMES A. CAMELFORD
Woodling and Krost
attys Patented Apr. 13, 1943

2,316,571

UNITED STATES PATENT OFFICE 2,316,571

APPARATUS FOR TREATING ROLLING OILS

Russell P. Dunmire and James A. Camelford, Cleveland, Ohio, assignors to The Buckeye Laboratories, Inc., a corporation of Ohio Application June 4, 1942, Serial No. 445,819

5 Claims. (Cl. 80—1)

Our invention is directed to apparatus for treating, purifying, and re-refining fatty substances of the class consisting of oils and waxes and preferably vegetable substances of the class consisting of oils and waxes and more particularly to palm oil used in steel mills for cold rolling of steel strips and in the reduction of steel strips.

In the cold rolling of steel, streams of oil such, for example, as palm oil, are directed on the steel strips together with large volumes of cooling water. The used oil, together with the water, is then drained into a collection system comprising basins and tanks located in the basement of the mill where separation occurs and the palm oil forms a sludge containing a large percentage of water. The material which is treated is this emulsion or sludge.

The sludge may contain many small solid particles such as steel chips, solid carbonaceous matter, sand and other materials which may be readily removed by screening or by other suitable means. Besides the solid particles, the sludge contains soluble metallo-organic contaminants of a relatively low molecular weight and soluble metallo-organic contaminants of a relatively high molecular weight and the polymers thereof. The contaminants of the low molecular weight may comprise acetic acid, propionic acid, butyric acid, and valeric acid and their esters and metallic salts of these acids and of their isomers. The contaminants of the relatively high molecular weight may comprise compounds of the type which may be represented generically by the formula:

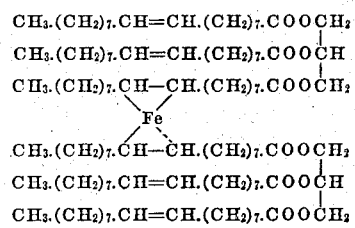

In addition to the above mentioned contaminants, the used or contaminated oil may contain the iron or metallic soaps of the normally occurring fatty acids in the palm oil and the condensation products of the unsaturated fatty acids and of their glycerides.

An object of our invention is the provision of recovering and purifying the oil for recurrent use in the mills.

Another object of our invention is the provision of recovering the water which is separated from the oil and filtering the separated water to free the same of impurities entrained therein for further use in the mill.

Another object of our invention is the provision of selectively transferring the new oil and the re-refined oil to the mill with the re-refined oil predominating in amount.

Another object of our invention is the provision of utilizing a retort both as a pre-conditioning vessel and a re-refining vessel.

Another object of our invention is the provision of utilizing a retort as a pre-conditioning vessel to pre-condition the oil to be treated, withdrawing a portion of the pre-conditioned oil from the retort and mixing same with a solid adsorbent material to form a slurry, after which the slurry is returned to the retort and there mixed with the oil remaining in the retort.

Another object of our invention is the provision of removing a portion of the pre-conditioned oil from the retort for mixing with a solid adsorbent material while the oil remains in a heated state.

Another object of our invention is the provision of introducing steam in the retort to aid in the pre-conditioning of the oil.

Another object of our invention is to precondition the fatty substances prior to subjecting them to a re-refining process utilizing a combined action of adsorption and distillation.

Another object of our invention is to precondition the metallo-organic contaminants in the contaminated or used fatty substances before subjecting the contaminated or used fatty substances to a re-refining process utilizing a combined action of adsorption and distillation.

Another object of our invention is to catalytically precipitate the metal portion of the metallo-organic contaminants in the form of oxides and hydroxides to render same readily adsorbable by the adsorption action in the re-refining process and to liberate the organic portion of the metallo-organic contaminants to render the volatile fractions thereof readily removable by the distillation action in the re-refining process.

Another object of our invention is to provide for pre-conditioning the contaminated or used fatty substances by a reagent of the class of oxidizing agents, such for example, as salts of amphoteric oxides or hydroxides including potassium dichromate, sodium demolybdate and sodium tungstate before subjecting the contaminated or used fatty substances to a re-refining process utilizing a combined action of adsorption and distillation.

Another object of our invention is to pre-condition both the relatively low molecular weight contaminants and the relatively high molecular weight contaminants and the polymers thereof before subjecting the contaminated or used fatty substances to a re-refining process utilizing a combined action of adsorption and distillation.

Another object of our invention is directed to the provision of re-refining a contaminated or used fatty substance by first subjecting same to a pre-conditioning operation and then finally subjecting the contaminated or used fatty substances to a process utilizing a combined action of adsorption and distillation.

Other objects and a fuller understanding of our invention may be had by referring to the following description and claims, taken in conjunction with the accompanying drawing, in which:

The figure diagrammatically represents a system embodying our invention, the figure comprising the only view of the drawing.

With reference to the drawing, the rolling mill is designated by the reference character 10 and a supply of water and a quantity of oil are caused to flow over and about the material being treated in the mill and producing a contaminated water and oil sludge including soluble metallo-organic contaminants. The water is caused to flow over and about the material being treated at the rolling mill by opening the valve 11. The oil is caused to flow over and about the material being treated and the rolling mill by opening the valve 13 and operating the pump 14 which delivers oil to the rolling mill from a mill supply oil tank 12.

The water and oil mixture which is passed over and about the material being treated in the mill and the large rolls of the mill is collected in a large pit or sump indicated by the reference character 15, and that part of the oil which floats to the surface is skimmed off for recovery in accordance with the principle of our invention. The water is discharged into a sewer or other disposal by opening the valve 52 and closing the valve 45. The water which is discharged from the pit 15 may be recovered for further use in the mill by closing the valve 52 and opening the valve 45, whereupon the pump 43 forces the water through a filter 44 back upon the rolling mill for further use. The filter 44 frees the water from impurities entrained therein. The water which is discharged from the pit 15 contains a small amount of oil in a very finely divided state, in fact so fine as to be of colloidal size, so that when the water is circulated for re-use, the filter 44 removes this small amount of oil which is of a contaminated nature.

The oil which is skimmed off of the pit 15 is caused to flow to either one of two settling tanks 22 and 23, depending upon whether the valve 20 or the valve 21 is open or closed. The oil which is skimmed off of the pit 15 is pumped to either one of the two settling tanks 22 or 23 by means of a pump 17 when the valves 16 and 19 are open and the valve 18 is closed. The valve 16 is positioned in advance of the pump 17 so that the oil may collect in the skimming pit 15 before pumping it into either one of the two settling tanks 22 or 23. In the case of an emergency, the oil may be discharged into a sewer or other disposal by opening the valve 18 and closing the valve 19.

The oil sludge which is delivered to the settling tanks 22 and 23 contains water which is drained off from the tanks to the sewer as illustrated. The water may be drained from the settling tanks 22 and 23, respectively, by opening the valves 46 and 47. Before the valves 46 and 47 are opened to discharge the water to the sewer from the settling tanks, the oil sludge is heated and is permitted to remain in a quiet state to cause further separation between the oil and water. In the practice of our invention, the oil sludge in the heating tanks is heated above the melting point of the oil but below the boiling point of the water, and preferably in the range of 180 degrees to 200 degrees Fahrenheit.

The oil which settles on top of the water in the settling tanks is transferred to a retort illustrated generally by the reference character 27. A pump 26 is arranged to pump the oil to the retort 27. When oil is being transferred from the settling tank 22 the valve 24 is open and when oil is being transferred from the settling tank 23 the valve 25 is open. The object of having two settling tanks is that one of the tanks may be in the operation of being filled from the skimming pit 15 while the other tank may be employed to supply oil to the retort 27.

The retort 27 is equipped with a mechanical agitator 28 which may be suitably driven by the electric motor 29. The retort is of a sealed construction and is arranged to be evacuated by a vacuum pump 49. A condenser 48 is supplied in advance of the vacuum pump 49 from which water and condensed volatiles may be discharged to the sewer. The retort is also arranged to be heated by any suitable means for the purpose of carrying out the process. To the contaminated or used oil in the retort 27 we add a reagent of the class of oxidizing agents such, for example, as salts of amphoteric oxides or hydroxides including potassium dichromate, sodium dimolybdate and sodium tungstate. The oxidizing agent may be referred to as a pre-conditioning agent and is supplied to a mixer 34. In commercial practice, we preferably employ potassium dichromate and it is supplied to the mixer 34 in an aqueous solution where it is heated to a temperature preferably at about the boiling point of water. The aqueous solution of potassium dichromate or the pre-conditioning agent is transferred from the mixer 34 to the retort 27 by means of a pump 36 when the valve 35 is open. The water required for the preparation of the aqueous solution of the pre-conditioning agent may be supplied by opening the valve 37. The combined mixture of the pre-conditioning agent and the contaminated or used oil sludge in the retort 27 is mechanically mixed by the agitator 28, while under vacuum and while heat is applied to the retort. The pre-conditioning agent is added to the contaminated oil sludge in the retort in solution form in order to obtain intimate contact between the pre-conditioning agent and the contaminated or used oil sludge. The aqueous solution of the oxidizing agent is added to the oil sludge in the retort in order to separate the metal portion of the metallo-organic contaminants in the form of a precipitate whereby the precipitate may be later filtered out. Heat is applied to the retort and a vacuum is maintained therein to dehydrate the mixture of the oil sludge and the aqueous solution of the pre-conditioning agent. We find in practice that the dehydrating action may be hastened by injecting steam into the mixture of the oil and the aqueous solution of the pre-conditioning agent. As illustrated in the drawing, steam may be introduced in the retort by opening the valve 30. The vacuum is maintained as high as possible although it may not be maintained in a perfect state since steam is being introduced into the retort. The higher that the vacuum is maintained, the more readily the process of dehydrating the mixture of the oil sludge and the aqueous solution of the pre-conditioning agent may be carried out. The heating of the mixture of the pre-conditioning agent and the contaminated oil in the retort 27 is continued until substantially all of the water has been evaporated and in this heating operation the temperature may be raised to a value in the neighborhood of 250 degrees F. and there maintained. In the practice of our invention, lower or higher temperatures may be used because the main object is to provide enough heat to take care of the latent heat of evaporation of the water contained in the mixture. The concentration of the pre-conditioning agent is not critical within wide limits although we prefer to employ between 1% and 5% of the weight of the oil contained in the sludge. Any excess of solid oxidation agent present may be readily removed by filtration from the anhydrous oil. The mechanical action of the agitator 28 is preferably continued while the heating operation is carried out to remove the water. The introduction of the steam to the retort is discontinued as the dehydration of the sludge approaches completion.

The pre-conditioning agent oxidizes the iron present in the ferrous form to the ferric form and then catalytically promotes the precipitation of the metal portion of the metallo-organic contaminants in the form of oxides and hydroxides to render same readily adsorbable by the adsorption action in the re-refining operation and the liberation of the organic portion of the metallo-organic contaminants to render the volatile fraction thereof readily removable by the distillation action in the re-refining operation. The pre-conditioning agent chemically conditions the relatively low molecular weight metallo-organic contaminants by separating the metal portion thereof in the form of oxide and hydroxide to render same readily adsorbable by the adsorption action in the re-refining operation and by releasing the organic portion thereof to render the same readily removable by the distillation action in the re-refining operation and chemically conditions the relatively high molecular weight metallo-organic contaminants and the polymers thereof by separating the metal portion thereof in the form of low molecular weight compounds to render same readily adsorbable by the adsorption action in the re-refining operation and by releasing the organic portion thereof to render the volatile fraction thereof readily removable by the distillation action in the re-refining process. The reaction between the pre-conditioning agent and the contaminated or used oil is best obtained with the use of steam and under vigorous agitation and under relatively high temperatures in the neighborhood of 250 degrees F. Under these conditions good physical and chemical relationships exist between the pre-conditioning agent and the contaminated or used oil.

Up to the present point, the operation so far described may be referred to as a pre-conditioning stage after which the contaminated oil is now ready for a re-refining stage utilizing a combined action of adsorption and distillation. The operation which will now be described may be referred to as the re-refining stage. In carrying out the re-refining stage, we add to the mixture of the pre-conditioning agent and the contaminated or used oil a supply of solid adsorbent material in the retort or sealed container in the form of a slurry.

The slurry is prepared by transferring the dehydrated oil to the mixer 34 by opening the valves 31 and 33 and closing the valve 32. Only a portion of the dehydrated oil in the retort is transferred to the mixer 34 which is in the form of a slurry mixer. The dehydrated oil is transferred to the mixer 34 while in a heated condition. To this withdrawn dehydrated oil is added a solid adsorbent material which is mixed with the oil to form a slurry. The slurry is transferred to the retort by opening the valve 35 and operating the pump 36. The amount of the solid adsorbent material may vary with the particular type of oil being treated and the operation should be carried out with a sufficient amount of solid adsorbent material to effectively adsorb all of the adsorbable material and impurities in the contaminated or used oil. The solid adsorbent material may comprise bone char, carbon black, fuller's earth, etc.

In the re-refining stage the combined mixture of the pre-conditioning agent, the contaminated oil and the adsorbent material is vigorously agitated by the mechanical agitator 28 under a high vacuum. The temperature may vary in a range which extends up to a value at substantially 400 degrees F. to drive off the volatile impurities and preferably the temperature may vary in a range between 250 degrees to 400 degrees F. In the case of palm oil, we have found that treatment at temperatures in excess of a value substantially at 400 degrees F. leads to discoloration of the final product and also reduces the yield because of the decomposition of the unsaturated acids and esters. At temperatures below the value substantially at 400 degrees F. the yield is good but as the temperature substantially exceeds the value at substantially 400 degrees F. the yield rapidly decreases rendering the operation uneconomical. The mechanical agitation or stirring of the combined mixture of the pre-conditioning agent, the contaminated or used oil, and the adsorbent material in the sealed container brings all of the constituents thereof in close intimate physical contact and the adsorbent material thereby adsorbs the substantially non-volatile impurities. The heating of the retort drives off the volatile impurities by distillation. The final mass in the retort after the heating and stirring is finished is then removed from the retort and filtered in the filter indicated by the reference character 38. The material may be transferred from the retort 27 to the filter by opening the valves 31 and 32 and closing the valve 33. A pump 50 is employed to transfer the material from the retort 27 to the filter 38. The filter 38 separates the adsorbent material and the adsorbed impurities from the oil being treated to recover the latter. The filter also removes any solid precipitated particles.

The time of the agitation may vary from 15 minutes to one hour depending upon the temperature employed in the re-refining stage, the amount of the adsorbent material employed and the degree to which the oil has been contaminated. The filtered oil is received by a re-refining oil tank 39. The oil from the re-refined oil tank 39 and the new oil in the new oil tank 42 are selectively transferred by means of a pump 53 to the mill supply oil tank 12 with the re-refined oil predominating in amount. The characteristics of the re-refined oil are such that it may be readily mixed with the new oil without undesirable effects.

Although we have described our invention with a certain degree of particularity, it is understood that the present disclosure has been made only by way of example and that numerous changes may be resorted to without departing from the spirit and the scope of the invention as hereinafter claimed.

We claim as our invention:

1. In a rolling mill where a supply of water and a quantity of palm oil from a mill supply tank are caused to flow over and about the mill rolls and the steel strips being rolled and producing a contaminated water and palm oil sludge including soluble metallo-organic contaminants, the combination with collection means for collecting the water and palm oil sludge and separating the palm oil sludge from the water, of treating apparatus for recovering and purifying the palm oil for recurrent use, said apparatus comprising a sealed retort adapted to receive a quantity of palm oil to be treated, first conduit means controlled by first valve means for transferring palm oil sludge from the collection means to the retort for a pre-condition treatment, a mixing container for receiving an aqueous solution of potassium dichromate, second conduit means controlled by second valve means for transferring the aqueous solution of potassium dichromate to the retort to pre-condition the palm oil sludge in the retort, means for heating the retort, means for evacuating the sealed retort, means to cause operation of the heating means and the evacuating means to continue the pre-conditioning of the palm oil sludge by driving off the water and by separating the metal portion of the metallo-organic contaminant from the palm oil sludge as a precipitate, third conduit means controlled by third valve means for transferring a portion of the pre-conditioned palm oil sludge to the mixing container, said mixing container constituting a slurry mixer to receive a quantity of solid adsorbent material to make a slurry with the pre-conditioned palm oil sludge in the mixing container, said slurry being transferred to the retort for mixture with the pre-conditioned palm oil sludge remaining in the retort through the said second conduit means, means for mechanically mixing and agitating the pre-conditioned palm oil sludge and the adsorbent material in the retort to adsorb the substantially non-volatile impurities while continuing the operation of the heating means and the evacuating means to drive off the volatile impurities, filter means for separating the adsorbent material and the solid impurities from the palm oil being treated to recover the latter for recurrent use in the mill, and fourth conduit means controlled by fourth valve means for transferring the recovered palm oil to the mill supply tank.

2. In a rolling mill where a supply of water and a quantity of palm oil from a mill supply tank are caused to flow over and about the mill rolls and the steel strips being rolled and producing a contaminated water and palm oil sludge including soluble metallo-organic contaminants, the combination with collection means for collecting the water and palm oil sludge and separating the palm oil sludge from the water, of treating apparatus for recovering and purifying the palm oil for recurrent use, said apparatus comprising a sealed retort adapted to receive a quantity of palm oil to be treated, first conduit means controlled by first valve means for transferring palm oil sludge from the collection means to the retort for a pre-condition treatment, a mixing container for receiving an aqueous solution of a metal precipitating catalyst, second conduit means controlled by second valve means for transferring the said aqueous solution to the retort to pre-condition the palm oil sludge in the retort, means for heating the retort, means for evacuating the sealed retort, means to cause operation of the heating means and the evacuating means to continue the pre-conditioning of the palm oil sludge by driving off the water and by separating the metal portion of the metallo-organic contaminant from the palm oil sludge as a precipitate, third conduit means controlled by third valve means for transferring a portion of the pre-conditioned palm oil sludge to the mixing container, said mixing container constituting a slurry mixer to receive a quantity of solid adsorbent material to make a slurry with the pre-conditioned palm oil sludge in the mixing container, said slurry being transferred to the retort for mixture with the pre-conditioned palm oil sludge remaining in the retort through the said second conduit means, means for mechanically mixing and agitating the pre-conditioned palm oil sludge and the adsorbent material in the retort to adsorb the substantially non-volatile impurities while continuing the operation of the heating means and the evacuating means to drive off the volatile impurities, filter means for separating the adsorbent material and the solid impurities from the palm oil being treated to recover the latter for recurrent use in the mill, and fourth conduit means controlled by fourth valve means for transferring the recovered palm oil to the mill supply tank.

3. In a rolling mill where a supply of water and a quantity of palm oil from a mill supply tank are caused to flow over and about the mill rolls and the steel strips being rolled and producing a contaminated water and palm oil sludge including soluble metallo-organic contaminants, the combination with collection means for collecting the water and palm oil sludge and separating the palm oil sludge from the water, of treating apparatus for recovering and purifying the palm oil for recurrent use, said apparatus comprising a sealed retort adapted to receive a quantity of palm oil to be treated, first conduit means controlled by first valve means for transferring palm oil sludge from the collection means to the retort for a pre-condition treatment, a mixing container for receiving an aqueous solution of a metal precipitating catalyst, second conduit means controlled by second valve means for transferring the said aqueous solution to the retort to pre-condition the palm oil sludge in the retort, means for heating the retort, means for evacuating the sealed retort, means to cause operation of the heating means and the evacuating means to continue the pre-conditioning of the palm oil sludge by driving off the water and by separating the metal portion of the metallo-organic contaminant from the palm oil sludge as a precipitate, means for introducing steam in the retort to aid in dehydrating the mixture of the palm oil sludge and the said aqueous solution, third conduit means controlled by third valve means for transferring a portion of the pre-conditioned palm oil sludge to the mixing container, said mixing container constituting a slurry mixer to receive a quantity of solid adsorbent material to make a slurry with the pre-conditioned palm oil sludge in the mixing container, said slurry being transferred to the retort for mixture with the pre-conditioned palm oil sludge remaining in the retort through the said second conduit means, means for mechanically mixing and agitating the pre-conditioned palm oil sludge and the adsorbent material in the retort to adsorb the substantially non-volatile impurities while continuing the operation of the heating means and the evacuating means to drive off the volatile impurities, filter means for separating the adsorbent material and the solid impurities from the palm oil being treated to recover the latter for recurrent use in the mill, and fourth conduit means controlled by fourth valve means for transferring the recovered palm oil to the mill supply tank.

4. In a rolling mill where a supply of water and a quantity of palm oil from a mill supply tank are caused to flow over and about the mill rolls and the steel strips being rolled and producing a contaminated water and palm oil sludge including soluble metallo-organic contaminants, the combination with collection means for collecting the water and palm oil sludge and separating the palm oil sludge from the water, of treating apparatus for recovering and purifying the palm oil for recurrent use, said apparatus comprising a sealed retort adapted to receive a quantity of palm oil to be treated, first conduit means controlled by first valve means for transferring palm oil sludge from the collection means to the retort for a pre-condition treatment, a mixing container for receiving an aqueous solution of a metal precipitating catalyst, second conduit means controlled by second valve means for transferring the said aqueous solution to the retort to pre-condition the palm oil sludge in the retort, means for heating the retort, means for evacuating the sealed retort, means to cause operation of the heating means and the evacuating means to continue the pre-conditioning of the palm oil sludge by driving off the water and by separating the metal portion of the metallo-organic contaminant from the palm oil sludge as a precipitate, third conduit means controlled by third valve means for transferring a portion of the pre-conditioned palm oil sludge to the mixing container, said mixing container constituting a slurry mixer to receive a quantity of solid adsorbent material to make a slurry with the pre-conditioned palm oil sludge in the mixing container, said slurry being transferred to the retort for mixture with the pre-conditioned palm oil sludge remaining in the retort through the said second conduit means, means for mechanically mixing and agitating the pre-conditioned palm oil sludge and the adsorbent material in the retort to adsorb the substantially non-volatile impurities while continuing the operation of the heating means and the evacuating means to drive off the volatile impurities, filter means for separating the adsorbent material and the solid impurities from the palm oil being treated to recover the latter for recurrent use in the mill, a re-refined palm oil tank, conduit means for transferring filtered palm oil from the filter means to the re-refined palm oil tank, a new palm oil tank, and fourth conduit means controlled by fourth valve means for selectively transferring palm oil from the re-refined palm oil tank or the new palm oil tank to the mill supplying tank.

5. In a rolling mill where a supply of water and a quantity of palm oil from a mill supply tank are caused to flow over and about the mill rolls and the steel strips being rolled and producing a contaminated water and palm oil sludge including soluble metallo-organic contaminants, the combination with collection means for collecting the water and palm oil sludge and separating the palm oil sludge from the water, of treating apparatus for recovering and purifying the palm oil for recurrent use, said apparatus comprising a sealed retort adapted to receive a quantity of palm oil to be treated, first conduit means controlled by first valve means for transferring palm oil sludge from the collection means to the retort for a pre-condition treatment, a mixing container for receiving an aqueous solution of a metal precipitating catalyst, second conduit means controlled by second valve means for transferring the said aqueous solution to the retort to pre-condition the palm oil sludge in the retort, means for heating the retort, means for evacuating the sealed retort, means to cause operation of the heating means and the evacuating means to continue the pre-conditioning of the palm oil sludge by driving off the water and by separating the metal portion of the metallo-organic contaminant from the palm oil sludge as a precipitate, third conduit means controlled by third valve means for transferring a portion of the pre-conditioned palm oil sludge to the mixing container, said mixing container constituting a slurry mixer to receive a quantity of solid adsorbent material to make a slurry with the pre-conditioned palm oil sludge in the mixing container, said slurry being transferred to the retort for mixture with the pre-conditioned palm oil sludge remaining in the retort through the said second conduit means, means for mechanically mixing and agitating the pre-conditioned palm oil sludge and the adsorbent material in the retort to adsorb the substantially non-volatile impurities while continuing the operation of the heating means and the evacuating means to drive off the volatile impurities, filter means for separating the adsorbent material and the solid impurities from the palm oil being treated to recover the latter for recurrent use in the mill, a re-refined palm oil tank, conduit means for transferring filtered palm oil from the filter means to the re-refined palm oil tank, a new palm oil tank, fourth conduit means controlled by fourth valve means for selectively transferring palm oil from the re-refined palm oil tank or the new palm oil tank to the mill supplying tank, and means for filtering the water separated from the palm oil sludge and returning same to the mill for recurrent use.

RUSSELL P. DUNMIRE.
JAMES A. CAMELFORD.